United States Patent [19]

Stav et al.

[11] Patent Number: 5,685,903
[45] Date of Patent: Nov. 11, 1997

[54] CEMENTITIOUS GYPSUM-CONTAINING COMPOSITIONS AND MATERIALS MADE THEREFROM

[75] Inventors: Elisha Stav, Amherst; Edward A. Burkard; Ronald S. Finkelstein, both of East Amherst, all of N.Y.

[73] Assignee: National Gypsum Company, Charlotte, N.C.

[21] Appl. No.: 713,727

[22] Filed: Sep. 13, 1996

Related U.S. Application Data

[63] Continuation-in-part of Ser. No. 384,756, Feb. 7, 1995, abandoned, which is a continuation-in-part of Ser. No. 253,333, Jun. 3, 1994, abandoned.

[51] Int. Cl.$^6$ .............................. C04B 7/04; C04B 11/28
[52] U.S. Cl. ............... 106/735; 106/672; 106/676; 106/679; 106/680; 106/705; 106/715; 106/716; 106/724; 106/732; 106/737; 106/778; 106/788; 106/819; 106/823
[58] Field of Search ............... 106/724, 732, 106/735, 737, 772, 778, 785, 823, 672, 680, 676, 679, 715, 716, 819, 788

[56] References Cited

U.S. PATENT DOCUMENTS

| | | | |
|---|---|---|---|
| 3,628,973 | 12/1971 | Greening et al. | 106/89 |
| 3,839,269 | 10/1974 | Comegys | 260/41 |
| 4,159,912 | 7/1979 | Jorgenson | 106/788 |
| 4,350,533 | 9/1982 | Galer et al. | 106/89 |
| 4,494,990 | 1/1985 | Harris | 106/732 |
| 5,075,358 | 12/1991 | Riley et al. | 524/5 |
| 5,154,874 | 10/1992 | Koslowski | 264/333 |
| 5,227,100 | 7/1993 | Koslowski et al. | 264/26 |
| 5,320,677 | 6/1994 | Baig | 106/780 |
| 5,346,550 | 9/1994 | Kunzi et al. | 106/735 |
| 5,424,099 | 6/1995 | Stewart et al. | 106/735 |
| 5,439,518 | 8/1995 | Francis et al. | 106/778 |

FOREIGN PATENT DOCUMENTS

| | | |
|---|---|---|
| 103 119 | 3/1984 | European Pat. Off. . |
| 1 241 330 | 10/1963 | Germany . |
| 24 30 683 | 1/1976 | Germany . |
| 140 245 | 2/1980 | Germany . |
| 32 30 406 | 2/1984 | Germany . |

OTHER PUBLICATIONS

Kosmatra et al. "Design & Control of Concrete Mixtures" PCA, Thirteenth Edition, 1988, pp. 15,16,64,65 (no month).
Bentur et al., "Gypsum of Improved Performance Using Blends with Portland Cement & Silica Fume", pp. 1–6 (paper from the Israel Institute of Technology, Haifa, Israel; received by mail on Jul. 12, 1993).
International Search Report Mailed Sep. 14, 1995 in PCT/US95/06543.

*Primary Examiner*—Michael Marcheschi
*Attorney, Agent, or Firm*—Marshall, O'Toole, Gerstein, Murray & Borun

[57] ABSTRACT

A cementitious composition useful for water-resistant construction materials, including floor underlayments, backing boards, self-leveling floor materials, road patching materials, fiberboard, fire-proofing sprays, and fire-stopping materials includes about 20 wt. % to about 75 wt. % calcium sulfate beta-hemihydrate, about 10 wt. % to about 50 wt. % Portland cement, about 4 wt. % to about 20 wt. % silica fume and about 1 wt. % to about 50 wt. % pozzolanic aggregate. The Portland cement component may also be a blend of Portland cement with fly ash and/or ground blast slag.

24 Claims, 3 Drawing Sheets

CEMENTITIOUS GYPSUM-CONTAINING COMPOSITIONS AND MATERIALS MADE THEREFROM

CROSS REFERENCE TO RELATED APPLICATIONS

This is a continuation-in-part of U.S. application Ser. No. 08/384,756, filed Feb. 7, 1995, now abandoned, which is a continuation-in-part of U.S. application Ser. No. 08/253,333 filed Jun. 3, 1994, also abandoned.

BACKGROUND OF THE INVENTION

1. Field of the Invention

The invention relates to cementitious compositions and in particular to cementitious construction materials such as floor underlayments, backer boards, floor and road patching materials, fiberboard, fire-proofing sprays, and fire-stopping materials made from a composition comprising gypsum, Portland cement and silica fume.

2. Description of Related Technology

Construction materials, such as backer boards for showers and floor underlayments, typically do not contain gypsum because gypsum-containing materials are usually not water resistant. However, gypsum is a desirable component in construction materials due to its rapid cure and early strength characteristics. Attempts to improve the water-resistance of gypsum boards by mixing Portland cement and gypsum (calcium sulfate hemihydrate) have met with limited success because such a mixture can result in the formation of ettringite, which causes expansion of the gypsum/Portland cement product and thus leads to its deterioration. Ettringites are formed when tricalcium aluminate ($3CaO.Al_2O_3$) in the Portland cement reacts with sulfate.

A cementitious composition useful as a pavement patching compound which contains Portland cement and alpha gypsum is disclosed in Harris, U.S. Pat. No. 4,494,990. The composition also includes a pozzolan source, such as, for example, silica fume, fly ash or blast furnace slag. The Harris patent discloses that the pozzolan blocks the interaction between the tricalcium aluminate and the sulfate from gypsum. The Harris patent discloses mixing a three-component blend of Type I Portland cement, alpha gypsum and silica fume with a fine aggregate to prepare a mortar used to cast mortar cubes for evaluating the strength of the resulting composition.

Ortega et al., U.S. Pat. No. 4,661,159 discloses a floor underlayment composition that includes alpha gypsum, beta gypsum, fly ash and Portland cement. The patent also discloses that the floor underlayment material can be used with water and sand or other aggregate to produce a fluid mixture which may be applied to a substrate.

SUMMARY OF THE INVENTION

It is an object of the invention to overcome one or more of the problems described above.

According to the invention, a cementitious composition includes about 20 wt. % to about 75 wt. % calcium sulfate beta-hemihydrate, about 10 wt. % to about 50 wt. % Portland cement, about 4 wt. % to about 20 wt. % silica fume and about 1 wt. % to about 50 wt. % pozzolanic aggregate. The Portland cement component may also be a blend of Portland cement with fly ash and/or ground blast slag. The invention further includes construction compositions and materials made from the inventive cementitious composition.

Other objects and advantages of the invention will be apparent to those skilled in the art from the following detailed description taken in conjunction with the drawings and the appended claims.

DETAILED DESCRIPTION OF THE INVENTION

Figure 1:
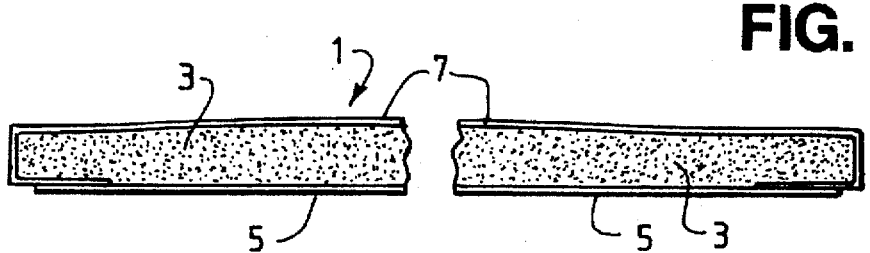
FIG. 1 is a cross-sectional view of a covered board according to the invention.

According to the invention, a composition for use in construction materials is provided which is particularly useful in areas where water resistance is an important consideration, such as for backer boards for baths and showers, floor underlay applications and exterior sheathing boards. Further uses of the inventive composition include materials such as self-leveling floors and road patching materials, fireproofing sprays, fire-stopping materials, and fiberboard.

Compositions according to the invention include bout 20 wt. % to about 75 wt. % calcium sulfate beta-hemihydrate (i.e., beta-gypsum), about 10 wt. % to about 50 wt. % Portland cement (Type III is preferred), about 4 wt. % to about 20 wt. % silica fume, and about 1 wt. % to about 50 wt. % pozzolanic aggregate as filler.

The beta-gypsum component of the inventive composition is calcium sulfate beta hemihydrate, commonly referred to as stucco. Beta-gypsum is traditionally less expensive than alpha-gypsum. Alpha-hemihydrate powder has a higher apparent density and smaller related surface area than beta-hemihydrate, resulting in a lower water requirement for the same workability and a higher compressive strength of the set material. However, boards made from the inventive composition have exhibited more than adequate strength for interior applications such as backer boards and floor underlayments and exterior applications, such as exterior sheeting and eaves.

The Portland cement component of the composition according to the invention may be any of Types I, II, III, IV, or IV (or mixtures thereof) as set forth according to ASTM standards. However, Type III Portland cement is preferred. Type III Portland cement cures faster than Type I and Type II Portland cement and exhibits an early high strength.

Blended cements also may be used in compositions according to the invention. Blended cements are blends of Portland cement with one or more pozzolanic materials such as fly ash and blast-furnace slag. The pozzolanic materials that are added to produce a "blend" with Portland cement are distinguished from the pozzolanic aggregate filler component according to the invention of the application in that the components of the cement "blend" have a particle size which is in the same range as the particle size range of Portland cement. Portland cement particle size may be defined as having approximately 15% of the particles retained on a 325 mesh screen. In other words, at least 85% of the Portland cement particles pass through a 325 mesh screen (allows particles having a diameter of up to 45 microns to pass through). Thus, for example, blast furnace slag and certain fly ash must be ground prior to mixing with Portland cement to result in a "blend" for use in the invention.

The silica fume component of compositions according to the invention is an extremely active pozzolan and prevents the formation of ettringite. Silica fume is very fine (particle average diameter of between about 0.1 microns and about 0.3 microns), has a high surface area (between about 20 $meter^2/gram$ and about 30 $meter^2/gram$), and is highly amorphous (between about 98 wt. % and about 100 wt. % amorphous $SiO_2$ (glassy material)).

The pozzolanic aggregate filler component of compositions according to the invention may be a natural or man-made filler that contains a high percentage of amorphous silica. Natural pozzolanic aggregates are of volcanic origin and include trass, pumice, and perlite. Man-made pozzolanic aggregate fillers include fly ash and FILLITE (hollow silicate spheres which may be made from fly ash; produced by Fillite Division of Boliden Intertrade, Inc. Atlanta, Ga.). As compared to cement "blend" components of the invention, pozzolanic aggregates used as fillers according to the invention are defined herein as having an average particle size larger than that of Portland cement (i.e., average particle size larger than 45 microns).

Pozzolanic aggregate fillers contain a high percentage of amorphous silica which possesses little or no cementitious properties. However, in the presence of moisture, pozzolanic aggregates have surfaces that are chemically reactive with calcium hydroxide at standard temperatures to form hydrated calcium silicate (CSH) which, in compositions and methods according to the invention, are believed to become a homogeneous part of a cementitious system due also to the presence of the finely divided pozzolan of the invention, silica fume. Compositions according to the invention which include both a pozzolanic aggregate and a finely divided pozzolan result in cementitious materials wherein the transition zone between the aggregate and a cement paste is densified and thus produces a cured product of higher compressive strength than compositions which utilize a pozzolanic aggregate alone or a finely divided pozzolan alone. It is believed that the mechanism which causes changes in the microstructure of compositions according to the invention to result in higher compressive strengths is associated with two effects: a pozzolanic effect and a micro-filler effect (due to the fine size and spherical shape of the silica fume).

Compositions for construction materials such as backer boards and floor underlays according to the invention preferably include about 20 wt. % to about 75 wt. % calcium sulfate beta-hemihydrate (about 30 wt. % to about 50 wt. % is preferred), about 10 wt. % to about 50 wt. % Portland cement (about 6 wt. % to about 35 wt. % is preferred), about 4 wt. % to about 20 wt. % silica fume (about 4 wt. % to about 10 wt. % is preferred), and about 10 wt. % to about 50 wt. % a pozzolanic aggregate filler (about 25 wt. % to about 35 wt. % is preferred). A preferred aggregate filler for use in such construction materials is pumice. Pumice is desirable as it is relatively light weight and can be sized to result in a product of desirable strength and physical properties. For example, Hess Pumice Products Inc. manufactures a size No. 10 pumice aggregate that measures about 93% greater than 1400 microns, while the size No. 5 pumice aggregate has a particle size measurement of about 23% greater than 1400 microns.

Although fillers such as calcium carbonate, crystalline silica and different types of clay could be included in the composition, it has been found that the use of a pozzolanic aggregate filler results in a product according to the invention having superior properties. As explained above, this is believed to occur because the surfaces of the pozzolanic aggregate filler react with free lime to form hydrated calcium silicate (pozzolanic reaction) which becomes part of the product matrix. Such a reaction is only possible with pozzolanic aggregate fillers.

The composition according to the invention produces building materials which set up quickly, exhibit high strength and durability, and are water resistant. Gypsum boards produced from compositions according to the invention may be produced on a continuous line. Because the composition according to the invention sets up quickly (typically in three minutes or less), building materials made from the composition can be handled (e.g. sheets can be cut into smaller sheets or boards) much faster than products made from Portland cement alone. Unlike traditional gypsum board, boards or other products made from a composition according to the invention do not require kiln drying, and in fact, kiln drying should be avoided.

With reference to FIG. 1, a backer board 1 according to the invention comprises a core 3 made from a cementitious composition according to the invention and adjacent cover sheets 5 and 7 disposed at either side thereof. Such a board may be manufactured by the following process:

Raw gypsum may be calcined at about 160° C. (320° F.) to about 175° C. (374° F.) to form calcium sulfate hemihydrate. The calcined gypsum can be post-ground to a finer particle size if, for example, certain strengths, water requirements, and working properties are desired. The gypsum powder is fed to a mixer and blended with Portland cement, silica fume and a pozzolanic aggregate filler. The pozzolanic filler may be pumice, perlite, trass, or fly ash or a mixture thereof. Other ingredients that may be included in the composition are set control additives (e.g. accelerators), water reducing agents, water repellent additives and latex or polymer modifiers. The resulting blend is combined with a slight stoichiometric excess of water to produce a slurry. The slurry, which forms the core 3 of the board, is poured onto a lower, continuous cover sheet 5 which is disposed on a conveyor. Then, an upper continuous cover sheet 7 is placed on the core as it moves on the conveyor. The cover sheets 5 and 7 are preferably made from fiberglass matt, fiberglass scrim, or a composite of both. The cover sheets may also be made from polyethylene, polypropylene or nylon; however, such materials are not as desirable as fiberglass as they are more expensive. As the slurry sets, scrim and mat are imbedded into the slurry matrix during the forming process. As the covered board moves along the conveyor line in a continuous sheet, the board gains sufficient strength so that it can be handled. The board is then cut into sections, (for backer boards, usually either 3 ft.×5 ft. or 3 ft.×4 ft. sheets) and transferred to pallets. The board thickness preferably ranges between about ⅛ inch and about ⅝ inch. The boards are then preferably stacked and cured from one to seven days (particularly preferred about three days) at a temperature of about 16° C. (60° F.) to about 27° C. (80° F.) (i.e. room temperature) and a humidity of about 40% to about 70%, after which the boards may be sent to a customer. The stacking of the boards advantageously provides a moist environment for curing. The boards may be cured at temperatures and humidities outside of the above-stated ranges resulting in an acceptable product. However, this may extend the curing time. A board according to the invention usually substantially reaches its full strength about fourteen to about twenty-eight days after formation.

When preparing a board or other product according to the invention, the forced drying required for gypsum board should be avoided. An alternative curing procedure is to cover or wrap the boards in plastic wrapping for about three days to retain moisture for continuous curing. Such covered boards have exhibited about 50% higher strength than normal gypsum boards of the same density. Also, the covered boards develop about 70% to about 80% of their ultimate strength in three days.

When a board or other product having a thickness of about ⅛ inch is desired, the cementitious composition thereof preferably includes about 20 wt. % to about 75 wt. % calcium sulfate beta-hemihydrate, about 10 wt. % to about 50 wt. % Portland cement, about 4 wt. % to about 20 wt. % silica fume, and about 1 wt. % to about 50 wt. % pozzolanic aggregate filler, resulting in a very strong thin product, especially useful, for example, for floor underlayments. A preferred cementitious composition for use in very thin boards (i.e. about ⅛ inch) and floor underlayments includes about 70 wt. % to about 75 wt. % calcium sulfate beta hemihydrate (about 74 wt. % is particularly preferred), about 15 wt. % to about 40 wt. % Portland cement (about 35 wt. % is particularly preferred), about 4 wt. % to about 10 wt. % silica fume (about 10 wt. % is particularly preferred), and about 1 wt. % to about 25 wt. % pozzolanic filler.

Compositions according to the invention may also be used to prepare self-leveling floor compositions and road patching materials. In such materials, a master blend composition according to the invention is prepared which includes about 20 wt. % to about 75 wt. % calcium sulfate beta-hemihydrate (i.e. beta-gypsum) (about 30 wt. % to about 50 wt. % is preferred), about 10 wt. % to about 50 wt. % Portland cement (about 6 wt. % to about 25 wt. % is preferred), about 4 wt. % to about 20 wt. % silica fume (about 4 wt. % to about 8 wt. % is preferred), and about 1 wt. % to about 50 wt. % a pozzolanic aggregate filler (about 1 wt. % to about 15 wt. % is preferred; about 1 wt. % to about 5 wt. % particularly preferred). The master blend is then mixed with silica aggregates (i.e., predominately quartz local sand) to form the floor or road patching material.

Preferably, a self-leveling floor composition according to the invention includes (i) about 25 wt. % to about 75 wt. % of the master blend; and (ii) about 75 wt. % to about 25 wt. % sand. Most preferably, a self-leveling floor composition master blend includes about 71 wt. % calcium sulfate beta-hemihydrate, about 20 wt. % Portland cement, about 6 wt. % silica fume and about 2 wt. % FILLITE pozzolanic filler. Because of its low density, FILLITE addition of amounts as low as about 1 wt. % of the composition provide a considerable volume of filler (see Example 2, Table II for FILLITE physical properties).

A road patching composition according to the invention includes (i) about 25 wt. % to about 100 wt. % of the master blend described herein with respect to the self-leveling floor compositions of the invention; and (ii) about 75 wt. % to about 0 wt. % sand.

Compositions according to the invention may also be used in fiberboards according to the invention. Such fiberboards include (i) about 70 wt. % to about 90 wt. % of the master blend described herein with respect to the self-leveling floor compositions and road patching compositions of the invention; and (ii) about 30 wt. % to about 10 wt. % of a fiber component. The fiber component is preferably selected from the following: wood fibers, paper fibers, glass fibers, polyethylene fibers, polypropylene fibers, nylon fibers, and other plastic fibers.

Most preferably, a master blend according to the invention for use in such a fiberboard includes about 74 wt. % calcium sulfate beta-hemihydrate, about 20 wt. % Portland cement, and about 6 wt. % silica fume.

Fire-proofing sprays and fire-stopping materials may also be prepared utilizing compositions according to the invention. Such fire-proofing and fire-stopping materials include about 20 wt. % to about 75 wt. % calcium sulfate beta-hemihydrate (about 30 wt. % to about 50 wt. % is preferred), about 10 wt. % to about 50 wt. % Portland cement (about 10 wt. % to about 25 wt. % is preferred), about 4 wt. % to about 20 wt. % silica fume (about 4 wt. % to about 10 wt. % is preferred), and about 1 wt. % to about 50 wt. % a pozzolanic aggregate filler (about 1 wt. % to about 10 wt. % is preferred). Preferably, the pozzolanic filler is FILLITE or perlite or mixtures thereof. Fire-proofing sprays and fire-stopping materials according to the invention also preferably include about 1 wt. % to about 30 wt. % unexpanded vermiculite filler. Such fire-proofing and fire-stopping materials may also include up to about 2 wt. % glass fibers and up to about 2 wt. % of a thickening agent. The thickening agent is preferably selected from the following: cellulose derivatives, acrylic resins and mixtures thereof.

EXAMPLE 1

A cementitious composition according to the invention was prepared with components set forth in the amounts stated in Table I below:

TABLE I

| Material | Weight Percent |
| --- | --- |
| Beta-gypsum (Stucco) | 45.1 |
| Type III Portland Cement | 19.2 |
| Silica Fume | 9.5 |
| Pumice Filler | 24.6 |
| Perlite | 1.47 |
| W.R.A.[1] | 0.87 |
| Water Repellent Agent[2] | 0.11 |
| Accelerator (ball-milled CaSo$_4$.2H$_2$O gypsum dihydrate[3]) | 0.042 |

[1] Water reducing agent or wetting agent including lignosulfonates and /or naphthalene sulfonates manufactured by Georgia Pacific Corp. and Henkel Corp., respectively.
[2] A silicone product or like material, e.g., Veoceal 2100 and Veoceal 1311 (both TM designations of products manufactured by Wacker Silicone Corp.)
[3] See U.S. Pat. Nos. 3,920,465, 3,870,538 and 4,019,920

The materials identified in Table I were mixed and 100 grams thereof was mixed with 35.6 grams of water. About 1 wt. % to about 5 wt. % of a polymer latex (acrylic or SBR) was added to the mixture to improve flexibility. The mixture was then formed into boards according to the invention using a glass matt/scrim composite. The boards were tested for water absorption, nail holding properties, deflection, compression strength (wet and dry), water wicking characteristics and other ASTM specification requirements. The boards met the ASTM specifications with respect to each test.

EXAMPLE 2

A self-leveling floor composition #1 according to the invention was prepared with the components set forth in the amounts stated in Table II below. A cementitious composition #2 with components also set forth in the amounts stated in Table II below (which did not include a pozzolanic filler) was also prepared.

TABLE II

| Material | Composition #2 (weight percent) | Composition #1 (weight percent) |
|---|---|---|
| Beta-Gypsum (Stucco) | 36.1 | 40.0 |
| Type III Portland Cement | 9.8 | 10.8 |
| Silica Fume | 2.96 | 3.24 |
| Fillite 500 Pozzolanic Filler[1] | 0.0 | 1.35 |
| Sand (quartz; crystallized silica) | 49.4 | 43.26 |
| W.R.A.[2] | 0.82 | 0.9 |
| Retarder[3] | 0.06 | 0.06 |
| Anti-foaming agent[4] | 0.33 | 0.26 |

[1] Fillite Division of Boliden Intertrade, Inc., Atlanta Georgia. Hollow silicate spheres with the following physical properties: average particle density of 0.6–0.8 g/cc; average bulk density of 0.35–0.45 g/cc; and typical particle size of 5–300 microns. The shell composition includes 27 wt. % to 33 wt. % $Al_2O_3$, 55 wt. % to 65 wt. % $SiO_2$, and a maximum of 4 wt. % $Fe_2O_3$.
[2] Water reducing agent or wetting agent including lignosulfonates and/or napthalene sulfonates manufactured by Georgia Pacific Corp. and Henkel Corp., respectively.
[3] A natural protein-based material.
[4] A vegetable oil-based dry powder.

The shell composition includes 27 wt. % to 33 wt. % $Al_2O_3$, 55 wt. % to 65 wt. % $SiO_2$, and a maximum of 4 wt. % $Fe_2O_3$.

In order to form a floor composition of a smooth consistency, composition #1 was mixed with about 26 wt. % water and composition #2 was mixed with about 24 wt. % water. The density of composition #1 was 107 lbs./ft³. The density of composition #2 was 111.62 lbs./ft³.

Both compositions were allowed to dry at about 21° C. (70° F.) and a relative humidity of about 50 %. The compressive strengths of samples (2 inch by 2 inch by 2 inch cubes) of each of the compositions were tested after 2 hours of drying, and after 1, 3, 7 and 28 days by pressing in an Instron press according to ASTM C4729A.

Figure 2:
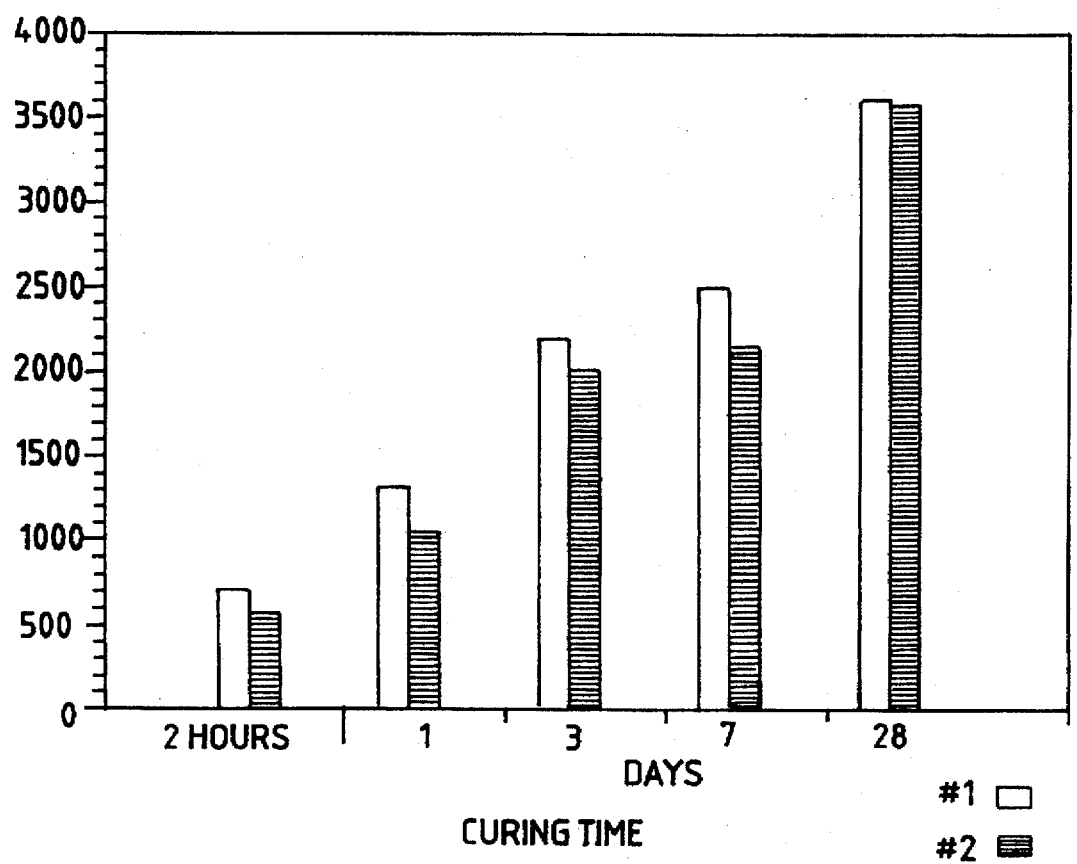
FIG. 2 is a graph depicting compressive strength vs. curing time for a composition #1 according to the invention and a comparative composition #2.

The results of the compressive strength tests are shown in FIG. 2. Composition #1 according to the invention exhibited a greater compressive strength than Composition #2 for all samples tested. Although the compressive strengths of both compositions were similar after curing for 28 days, the advantage of a composition according to the invention is evident when the densities of the two compositions are taken into consideration. Typically, a composition having a higher density should also exhibit a higher compressive strength. However, in this instance, Composition #1 according to the invention had a lower density than Composition #2, and yet exhibited a slightly higher compressive strength.

EXAMPLE 3

A cementitious composition according to the invention was prepared with components set forth in the amounts stated in Table III below:

TABLE III

| Material | Weight Percent |
|---|---|
| Beta-gypsum (Stucco) | 35.9 |
| Type III Portland Cement | 15.6 |
| Silica Fume | 7.8 |
| Pumice Filler | 39.5 |
| W.R.A.[1] | 0.87 |
| Water Repellent Agent[2] | 0.11 |
| Accelerator (ball-milled $CaSo_4.2H_2O$ gypsum dihydrate[3]) | 0.058 |

[1] Water reducing agent or wetting agent including lifnosulfonates and/or naphthalene sulfonates manufactured by Georgia Pacific Corp. and Henkel Corp., respectively.
[2] A silicone product or like material, e.g., Veoceal 2100 and Veoceal 1311 (both TM designations of products manufactured by Wacker Silicone Corp.)
[3] See U.S. Pat. Nos. 3,920,465, 3,870,538 and 4,019,920

The materials identified in Table III were mixed and 100 grams thereof was mixed with 35.6 grams of water. About 1 wt. % to about 5 wt. % of a polymer latex (acrylic or SBR) was added to the mixture to improve flexibility. The mixture was then formed into boards according to the invention using a glass matt/scrim composite. The boards were tested for water absorption, nail holding properties, deflection, compression strength (wet and dry), water wicking characteristics and other ASTM specification requirements. The boards met the ASTM specifications with respect to each test.

Figure 3:
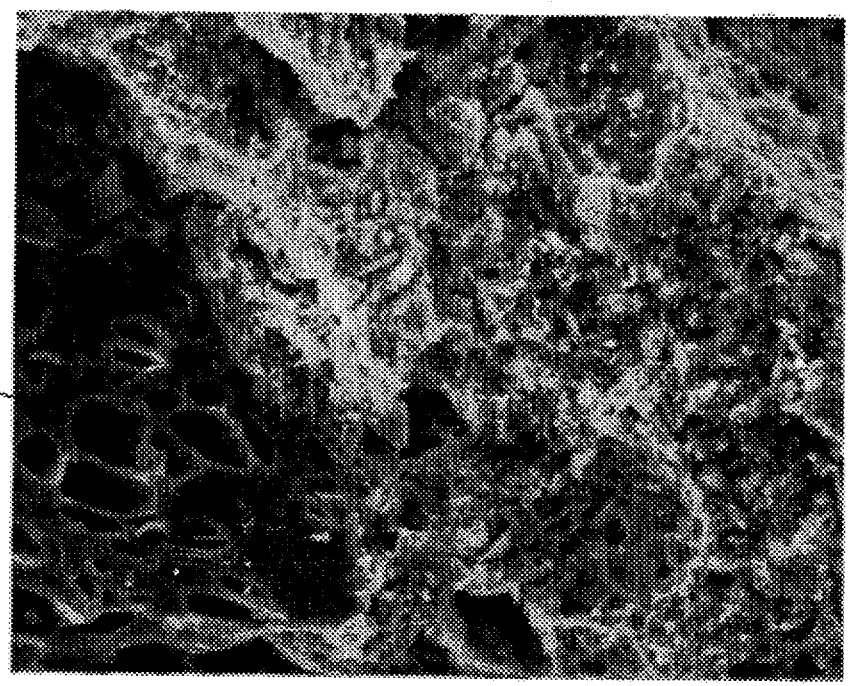
FIG. 3 is a scanning electron microscope (SEM) micrograph (500 x) of a board made from a composition according to the invention disclosed in Example 3.
Figure 4:
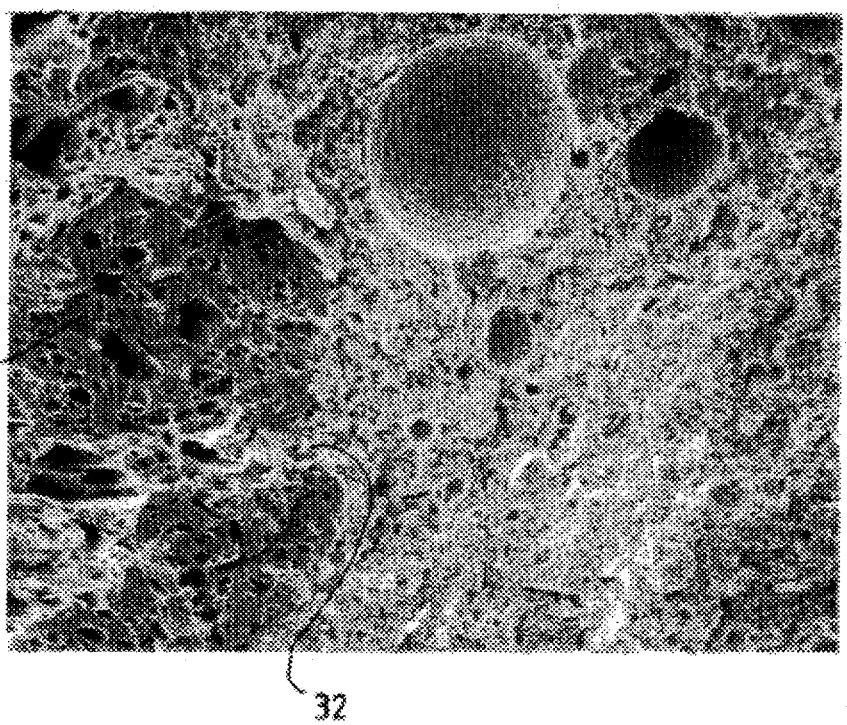
FIG. 4 is an SEM micrograph (100 x) of the board shown in FIG. 3.
Figure 5:
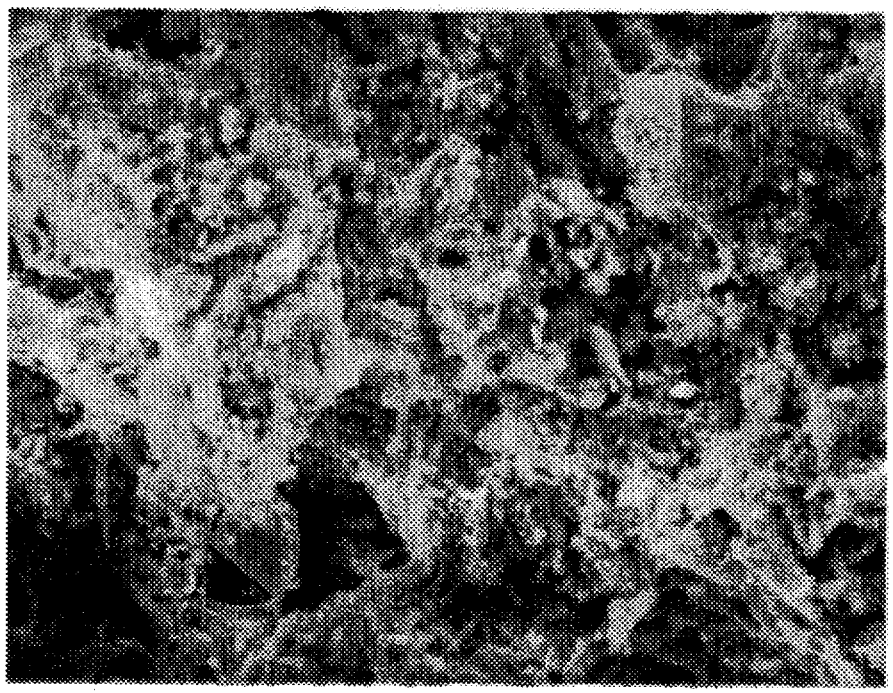
FIG. 5 is an SEM micrograph (1000 x) of the board shown in FIG. 3.

The scanning electron microscope (SEM) micrographs shown in FIGS. 3, 4, and 5 were made of a cured sample of Example 3. An arrow 30 points to pumice in the sample, illustrating that in a composition according to the invention, the pumice becomes part of the hydrated calcium silicate (CSH) matrix, substantially eliminating any transition zone 32 between the pumice filler and the cement paste.

EXAMPLE 4

A cementitious master blend binder according to the invention was prepared with the components set forth in the amounts stated in Table IV below:

TABLE IV

| Material | Approx. Weight Percent |
|---|---|
| Beta-gypsum (Stucco) | 40 |
| Type III Portland Cement | 46 |
| Silica Fume | 14 |
| Accelerator[1] | 0.35 |

[1] BMA (board milling accelerator, a fine-ground gypsum produced by National Gypsum Company).

The materials identified in Table IV were mixed to form the master blend binder. Then, about 75 wt. % of the binder was mixed with about 25 wt. % pumice aggregate (Hess Products, Inc., Malard City, Id.) and 100 grams thereof was mixed with 43 grams of water. To improve the workability of the mixture, a water reducing agent (lignosulfonates and/or naphthalene sulfonates manufactured by Georgia Pacific Corp. and Henkel Corp., respectively) was added. The mixture was then formed into two-inch by two-inch (2"×2") cubes to evaluate strength gain over the time lapse of twenty-eight days. The cubes were sealed in a plastic bag and kept at room temperature (about 25° C.).

For the purpose of comparison, about 75 wt. % of the master blend binder of Table IV was mixed with about 25 wt. % of $CaCO_2$, a non-pozzolanic aggregate having about the same particle size as the pumice, and 100 grams thereof was mixed with 44 grams of water. This mixture also was formed into two-inch by two-inch (2"×2") cubes to evaluate strength gain over the time lapse of twenty-eight days. The cubes were sealed in a plastic bag and kept at room temperature (about 25° C.).

The density and wet compressive strengths for the samples made according to the invention and the comparative samples made with CaCO$_3$ were measured and are shown in Table V below:

TABLE V

| Time Elapsed Days | Sample Made With Pozzolanic Aggregate | | Sample Made With Non-Pozzolanic Aggregate | |
|---|---|---|---|---|
| | Density[1] | Wet Compressive Strength[2] | Density[1] | Wet Compressive Strength[2] |
| 1 | 79.8 | 1151 | 87.0 | 725 |
| 3 | 83.3 | 1779 | 88.9 | 1329 |
| 7 | 83.3 | 2646 | 92.6 | 2155 |
| 28 | 84.8 | 4267 | 92.8 | 3983 |

[1]Pounds/cubic foot.
[2]Pounds/square inch.

Table V illustrates the acceptable weight strength development of the samples made from a composition according to the invention.

A second test was performed on the composition made from 75 wt. % master blend binder of Table IV and the pumice aggregate to study durability. A four and one-half inch (4½") diameter, one-half inch (½") thick patty of the composition was placed under running water for a period of two months. No deterioration of the patty was visible and the total weight loss of the patty after the two-month test was 0.5%.

In other tests, the master blend binder disclosed in Table IV was blended with up to about 50 wt. % pozzolanic aggregate filler (pumice or perlite), with and without foaming agent, to produce boards according to the invention. Such boards exhibited acceptable physical properties.

The foregoing detailed description is given for clearness of understanding only, and no unnecessary limitations should be understood therefrom, as modifications within the scope of the invention will be apparent to those skilled in the art.

We claim:

1. A cementitious composition consisting essentially of:
   (a) about 20 wt. % to about 75 wt. % calcium sulfate beta-hemihydrate;
   (b) about 10 wt. % to about 50 wt. % of a cement selected from the group consisting of Portland cement, a blend of Portland cement and fly ash, a blend of Portland cement and ground blast slag; and mixtures thereof;
   (c) about 4 wt. % to about 20 wt. % silica fume; and
   (d) about 1 wt. % to about 50 wt. % pozzolanic aggregate.

2. The composition of claim 1 wherein said composition is free of alpha-gypsum.

3. The composition of claim 1 wherein the Portland cement is Type III Portland cement.

4. The composition of claim 1 wherein the silica fume is about 4 wt % to about 8 wt. % of the composition.

5. The composition of claim 1 wherein the pozzolanic aggregate is about 10 wt % to about 50 wt. % of the composition and comprises pumice.

6. The composition of claim 1 wherein the pozzolanic aggregate is about 1 wt % to about 10 wt. % of the composition and comprises hollow silicate spheres.

7. The composition of claim 1 further consisting essentially of at least one component selected from the group consisting of set control additives, water reducing agents and water repellent additives.

8. A self-leveling floor composition comprising:
   (i) about 25 wt. % to about 75 wt. % of the composition of claim 1; and
   (ii) about 75 wt. % to about 25 wt. % sand.

9. The self-leveling floor composition of claim 8 wherein said composition (i) comprises about 72 wt. % calcium sulfate beta-hemihydrate, about 20 wt. % Portland cement, about 6 wt. % silica fume and about 2 wt. % pozzolanic aggregate.

10. The self-leveling floor composition of claim 9 wherein said pozzolanic aggregate comprises hollow silicate spheres.

11. A road patching composition comprising:
   (i) about 25 wt. % to about 100 wt. % of the composition of claim 1; and
   (ii) about 75 wt. % to about 0 wt. % sand.

12. A water resistant construction material prepared by combining a cementitious composition with a slight stoichiometric excess of water, said cementitious composition consisting essentially of:
   (a) about 20 wt. % to about 75 wt. % calcium sulfate beta-hemihydrate;
   (b) about 10 wt. % to about 50 wt. % of a cement selected from the group consisting of Portland cement, a blend of Portland cement and fly ash, a blend of Portland cement and ground blast slag; and mixtures thereof;
   (c) about 4 wt. % to about 20 wt. % silica fume; and
   (d) about 1 wt. % to about 50 wt. % pozzolanic aggregate.

13. The construction material of claim 12 wherein the cementitious composition is free of alpha-gypsum.

14. The construction material of claim 12 wherein the Portland cement is Type III Portland cement.

15. The construction material of claim 12 wherein the pozzolanic aggregate is about 10 wt. % to about 50 wt. % of the composition and comprises pumice.

16. The construction material of claim 12 wherein the silica fume is about 4 wt. % to about 8 wt. % of the composition.

17. The construction material of claim 12 wherein the cementitious composition further consisting essentially of at least one component selected from the group consisting of set control additives, water reducing agents and water repellent additives.

18. A water resistant construction material having a thickness of about ⅛ inch, said material prepared by combining a cementitious composition with a slight stoichiometric excess of water, said cementitious composition consisting essentially of:
   (a) about 20 wt. % to about 75 wt. % calcium sulfate beta-hemihydrate;
   (b) about 10 wt. % to about 50 wt. % of a cement selected from the group consisting of Portland cement, a blend of Portland cement and fly ash, a blend of Portland cement and ground blast slag; and mixtures thereof;
   (c) about 4 wt. % to about 20 wt. % silica fume; and
   (d) about 1 wt. % to about 50 wt. % pozzolanic aggregate.

19. The construction material of claim 18 wherein the cementitious composition is free of alpha-gypsum.

20. The construction material of claim 18 wherein the Portland cement is Type III Portland cement.

21. The construction material of claim 18 wherein the cementitious composition comprises:
   (a) about 70 wt. % to about 75 wt. % calcium sulfate beta hemihydrate;

(b) about 15 wt. % to about 25 wt. % Portland cement;

(c) about 4 wt. % to about 8 wt. % silica fume; and (d) about 1 wt. % to about 10 wt. % pozzolanic aggregate.

22. The construction material of claim 18 wherein the cementitious composition further consisting essentially of at least one component selected from the group consisting of set control additives, water reducing agents and water repellent additives.

23. A cementitious composition consisting essentially of:

(a) about 30 wt. % to about 75 wt. % calcium sulfate beta-hemihydrate;

(b) about 10 wt. % to about 40 wt. % Portland cement;

(c) about 5 wt. % to about 20 wt. % silica fume; and (d) about 10 wt. % to about 40 wt. % pozzolanic aggregate.

24. A cementitious composition consisting essentially of:

(a) about 30 wt. % to about 75 wt. % calcium sulfate beta-hemihydrate;

(b) about 10 wt. % to about 40 wt. % Portland cement;

(c) about 4 wt. % to about 20 wt. % silica fume; and (d) about 1 wt. % to about 40 wt. % pozzolanic aggregate.

* * * * *

UNITED STATES PATENT AND TRADEMARK OFFICE
CERTIFICATE OF CORRECTION

PATENT NO. : 5,685,903
DATED : November 11, 1997
INVENTOR(S) : Stav et al.

It is certified that error appears in the above-identified patent and that said Letters Patent is hereby corrected as shown below:

| | | | |
|---|---|---|---|
| 4,240,952 | 12/1980 | Hulbert, Jr. et al. | 260/42.13 |
| 4,321,243 | 03/1982 | Cornwell et al. | 423/268 |
| 4,327,146 | 04/1982 | White | 428/308.8 |
| 4,353,746 | 10/1982 | Birchall et al. | 106/89 |
| 4,353,747 | 10/1982 | Birchall et al. | 106/89 |
| 4,353,748 | 10/1982 | Birchall et al. | 106/89 |
| 4,403,006 | 09/1983 | Bruce et al. | 428/70 |
| 4,501,830 | 02/1985 | Miller et al. | 523/401 |
| 4,661,159 | 04/1987 | Ortega et al. | 106/89 |
| 4,684,407 | 08/1987 | Umezawa et al. | 106/90 |
| 4,746,365 | 05/1988 | Babcock et al. | 106/104 |
| 4,849,018 | 07/1989 | Babcock et al. | 106/104 |
| 4,921,537 | 05/1990 | Horiguchi et al. | 106/90 |
| 4,923,665 | 05/1990 | Anderson et al. | 264/259 |
| 4,948,429 | 08/1990 | Arfaei | 106/659 |
| 4,961,787 | 10/1990 | Majumdar et al. | 106/692 |
| 4,964,912 | 10/1990 | Okabayashi et al. | 106/705 |
| 5,030,282 | 07/1991 | Matsuhashi et al. | 106/692 |
| 5,030,289 | 07/1991 | Sattler et al. | 106/805 |
| 5,085,929 | 02/1992 | Bruce et al. | 428/309.9 |
| 5,096,497 | 03/1992 | Beale et al. | 106/692 |
| 5,111,627 | 05/1992 | Brown | 52/126.5 |
| 5,114,487 | 05/1992 | Gartshore et al. | 106/695 |
| 5,116,671 | 05/1992 | Bruce et al. | 428/309.9 |
| 5,121,795 | 06/1992 | Ewert et al. | 166/292 |
| 5,125,455 | 06/1992 | Harris et al. | 166/292 |
| 5,130,184 | 06/1992 | Ellis | 428/245 |
| 5,174,821 | 12/1992 | Matsuoka et al. | 106/730 |
| 5,205,091 | 04/1993 | Brown | 52/126.6 |
| 5,238,064 | 08/1993 | Dahl et al. | 166/293 |
| 5,273,579 | 12/1993 | Tanaka et al. | 106/715 |

UNITED STATES PATENT AND TRADEMARK OFFICE
CERTIFICATE OF CORRECTION

PATENT NO. : 5,685,903  
DATED : November 11, 1997  
INVENTOR(S) : Stav et al.

Page 2 of 3

It is certified that error appears in the above-identified patent and that said Letters Patent is hereby corrected as shown below:

Cover page, section entitled References Cited, add the following:

| | | | |
|---|---|---|---|
| 1,255,236 | 02/1918 | Schweimler et al. | |
| 1,511,500 | 10/1924 | Brookby | |
| 1,578,250 | 03/1926 | Armstrong | |
| 1,859,853 | 05/1932 | Thomson | |
| 2,341,426 | 02/1944 | Dailey | 106/110 |
| 2,362,060 | 11/1944 | Etridge et al. | 154/45.9 |
| 2,791,511 | 05/1957 | Nutley et al. | 106/109 |
| 2,954,302 | 09/1960 | Gorman | 117/60 |
| 3,017,305 | 01/1962 | Dailey | 156/10 |
| 3,232,777 | 02/1966 | Bush | 106/90 |
| 3,240,736 | 03/1966 | Beckwith | 260/29.2 |
| 3,411,924 | 11/1968 | Lapshin | 106/89 |
| 3,477,979 | 11/1969 | Hillyer | 260/29.2 |
| 3,516,882 | 06/1970 | Cummisford | 156/39 |
| 3,565,648 | 02/1971 | Mori et al. | 106/89 |
| 3,582,376 | 06/1971 | Ames | 106/90 |
| 3,607,486 | 09/1971 | Jacks et al. | 156/41 |
| 3,645,750 | 02/1972 | Sadran | 106/104 |
| 3,782,985 | 01/1974 | Gebhardt | 106/97 |
| 3,847,635 | 11/1974 | Lange et al. | 106/110 |
| 3,853,577 | 12/1974 | Nishida et al. | 117/8 |
| 3,910,798 | 10/1975 | Shires et al. | 106/38.3 |
| 3,988,279 | 10/1976 | Klassen | 260/29.2 |
| 4,067,939 | 01/1978 | Lowe et al. | 264/42 |
| 4,075,374 | 02/1978 | Jorgenson et al. | 427/355 |
| 4,194,919 | 03/1980 | Hattori et al. | 106/90 |
| 4,210,457 | 07/1980 | Dodson et al. | 106/97 |

UNITED STATES PATENT AND TRADEMARK OFFICE
CERTIFICATE OF CORRECTION

PATENT NO. : 5,685,903

DATED : November 11, 1997

INVENTOR(S) : Stav et al.

It is certified that error appears in the above-identified patent and that said Letters Patent is hereby corrected as shown below:

| | | | |
|---|---|---|---|
| 5,273,581 | 12/1993 | Koslowski et al. | 106/782 |
| 737,020 | 06/1966 | Canada | |
| 2 106 813 | 08/1972 | Germany | |
| 52-73919 | 06/1977 | Japan | |
| 53-79924 | 07/1978 | Japan | |
| 54-141818 | 11/1979 | Japan | |
| 56-155059 | 12/1981 | Japan | |

Column 2, line 32, delete "bout" and replace with --about--.

Column 7, line 4 of Table II, delete "Fillite" and replace with "FILLITE--.

Column 7, delete lines 27-29.

Column 8, footnote 1 of Table III, delete "lifnosulfonates" and replace with --lignosulfonates--.

Column 10, line 8 of Claim 9, delete "72 wt.% and replace with --71 wt.%--.

Signed and Sealed this

Twentieth Day of October, 1998

Attest:

BRUCE LEHMAN

Attesting Officer

Commissioner of Patents and Trademarks